(12) United States Patent
Lee et al.

(10) Patent No.: US 8,892,905 B2
(45) Date of Patent: Nov. 18, 2014

(54) METHOD AND APPARATUS FOR PERFORMING SELECTIVE ENCRYPTION/DECRYPTION IN A DATA STORAGE SYSTEM

(75) Inventors: Adam Y. Lee, San Jose, CA (US);
Varun Malhotra, Palo Alto, CA (US);
Daniel ManHung Wong, Sacramento, CA (US); Tirthankar Lahiri, Palo Alto, CA (US); Kiran Goyal, Foster City, CA (US); Juan R. Loaiza, Woodside, CA (US); Paul Youn, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2233 days.

(21) Appl. No.: 11/726,428

(22) Filed: Mar. 21, 2007

(65) Prior Publication Data

US 2008/0232592 A1 Sep. 25, 2008

(51) Int. Cl.
*G06Q 30/02* (2012.01)
*H04L 9/08* (2006.01)

(52) U.S. Cl.
CPC .................................. *H04L 9/0894* (2013.01)
USPC .......................... 713/193; 707/751; 707/766

(58) Field of Classification Search
CPC ..... G06F 17/3064; G06F 17/30; G06F 15/16; G06F 17/60; G06Q 30/02
USPC ............ 380/45, 277–284; 713/187–193, 156, 713/169; 707/751, 766
See application file for complete search history.

(56) References Cited

U.S. PATENT DOCUMENTS

| | | | | |
|---|---|---|---|---|
| 5,224,166 A * | 6/1993 | Hartman, Jr. | | 713/190 |
| 6,118,870 A * | 9/2000 | Boyle et al. | | 380/201 |
| 6,272,589 B1 * | 8/2001 | Aoki | | 711/112 |
| 6,523,118 B1 * | 2/2003 | Buer | | 713/189 |
| 7,111,005 B1 | 9/2006 | Wessman | | |
| 7,664,262 B2 * | 2/2010 | Haruki | | 380/200 |
| 7,957,532 B2 * | 6/2011 | Chen et al. | | 380/270 |
| 8,144,872 B2 * | 3/2012 | Hu et al. | | 380/263 |
| 8,392,725 B2 * | 3/2013 | McIntosh et al. | | 713/190 |
| 8,522,041 B2 * | 8/2013 | Hsu et al. | | 713/189 |
| 8,726,039 B2 * | 5/2014 | Amit et al. | | 713/189 |
| 2002/0029227 A1* | 3/2002 | Multer et al. | | 707/203 |

OTHER PUBLICATIONS

Nanda, Arup, Transparent Data Encryption, As Published in Oracle magazine, Sep./Oct. 2005,http://www.oracle.com/technology/oramag/oracle/05-sep/055security.html, pp. 1-6.

* cited by examiner

*Primary Examiner* — Kambiz Zand
*Assistant Examiner* — Phy Anh Vu
(74) *Attorney, Agent, or Firm* — Shun Yao; Park, Vaughan, Fleming & Dowler LLP

(57) ABSTRACT

One embodiment of the present invention provides a system for performing selective encryption/decryption in a data storage system. During operation, the system receives a data block from a storage medium at an input/output layer, wherein the input/output layer serves as an interface between the storage medium and a buffer cache. Next, the system determines whether the data block is an encrypted data block. If not, the system stores the data block in the buffer cache. Otherwise, if the data block is an encrypted data block, the system retrieves a storage-key, wherein the storage-key is associated with a subset of storage, which is associated with the encrypted data block. Using the storage-key, the system then decrypts the encrypted data block to produce a decrypted data block. Finally, the system stores the decrypted data block in the buffer cache, wherein the data block remains encrypted in the storage medium.

28 Claims, 6 Drawing Sheets

METHOD AND APPARATUS FOR PERFORMING SELECTIVE ENCRYPTION/DECRYPTION IN A DATA STORAGE SYSTEM

BACKGROUND

1. Field of the Invention

The present invention relates to data storage systems. More specifically, the present invention relates to a method and apparatus for performing selective encryption/decryption in a data storage system.

2. Related Art

Users typically desire to obtain both performance and security from a data storage system. However, securing data stored in a data storage system often results in decreased performance. For example, one common method of securing data stored in a data storage system is to encrypt the data. Subsequently, each time a user or an application requires access to the data, the data storage system must decrypt the data. If this decryption occurs infrequently, the decrease in performance may be tolerable. However, if the user requires access to a significant amount of data, or repeated access to the same data, the reduction in performance can be significant.

One technique for encrypting data in a data storage system is to encrypt data at the column level, which is referred to as "column-level encryption." However, if a user encrypts a large number of columns, column-level encryption can become tedious and time-consuming. Furthermore, known encryption schemes, such as column-level encryption, lack the ability to protect dependent data structures, such as auxiliary sort/join memory chunks.

Hence, what is needed is a system for securing data in a data storage system without the problems listed above.

SUMMARY

One embodiment of the present invention provides a system for performing selective encryption/decryption in a data storage system. During operation, the system receives a data block from a storage medium at an input/output layer, wherein the input/output layer serves as an interface between the storage medium and a buffer cache. Next, the system determines whether the data block is an encrypted data block. If not, the system stores the data block in the buffer cache. Otherwise, if the data block is an encrypted data block, the system retrieves a storage-key, wherein the storage-key is associated with a subset of storage, which is associated with the encrypted data block. Using the storage-key, the system then decrypts the encrypted data block to produce a decrypted data block. Finally, the system stores the decrypted data block in the buffer cache, wherein the data block remains encrypted in the storage medium.

In a variation on this embodiment, retrieving the storage-key involves determining if the storage-key is in the buffer cache. If so, the system retrieves the storage-key from the buffer cache. If not, the system retrieves the storage-key from the storage medium. The system then uses a typed master-key identifier associated with the storage-key to identify a typed master-key associated with the storage-key. Next, the system uses a master-key to decrypt the typed master-key to produce a decrypted typed master-key. Then, the system uses the decrypted typed master-key to decrypt the storage-key to produce a decrypted storage-key. Finally, the system stores the decrypted storage-key in the buffer cache.

In a further variation, the master-key and the typed-master-key are stored at a key-manager.

In a variation on this embodiment, the system additionally stores the un-encrypted data block to the storage medium by first retrieving the storage-key. Next, the system encrypts the un-encrypted data block using the storage-key to produce the encrypted data block. Finally, the system stores the encrypted data block on the storage medium.

In a variation on this embodiment, the system writes a log to the storage medium by determining if the data block in the buffer cache has been modified. If so, the system creates a change vector corresponding to the modified data block. Next, the system encrypts the change vector using the storage-key to produce an encrypted change vector. Then, the system writes the encrypted change vector to the log. Finally, the system stores the log on the storage medium without waiting for a buffer cache flush instruction.

In a further variation, the log can include: an undo log; a redo log; an archive log; and a trace file dump.

In a variation on this embodiment, the system can encrypt associated-data that is associated with the data block. This associated-data can include: an undo log; a redo log; an archive log; a trace file dump; meta-data; a query; an intermediate table, which contains an intermediate result of an operation associated with the data block; and an operation result, which is a result of the operation associated with the data block.

In a variation on this embodiment, the storage-key is a segment-key, which is associated with a segment, wherein the segment can be any collection of data blocks that forms a data storage system object.

In a variation on this embodiment, in response to the data storage system performing an unexpected operation, the system deletes contents of the buffer cache without dumping the contents of the buffer cache to the storage medium.

DETAILED DESCRIPTION

Figure 1:
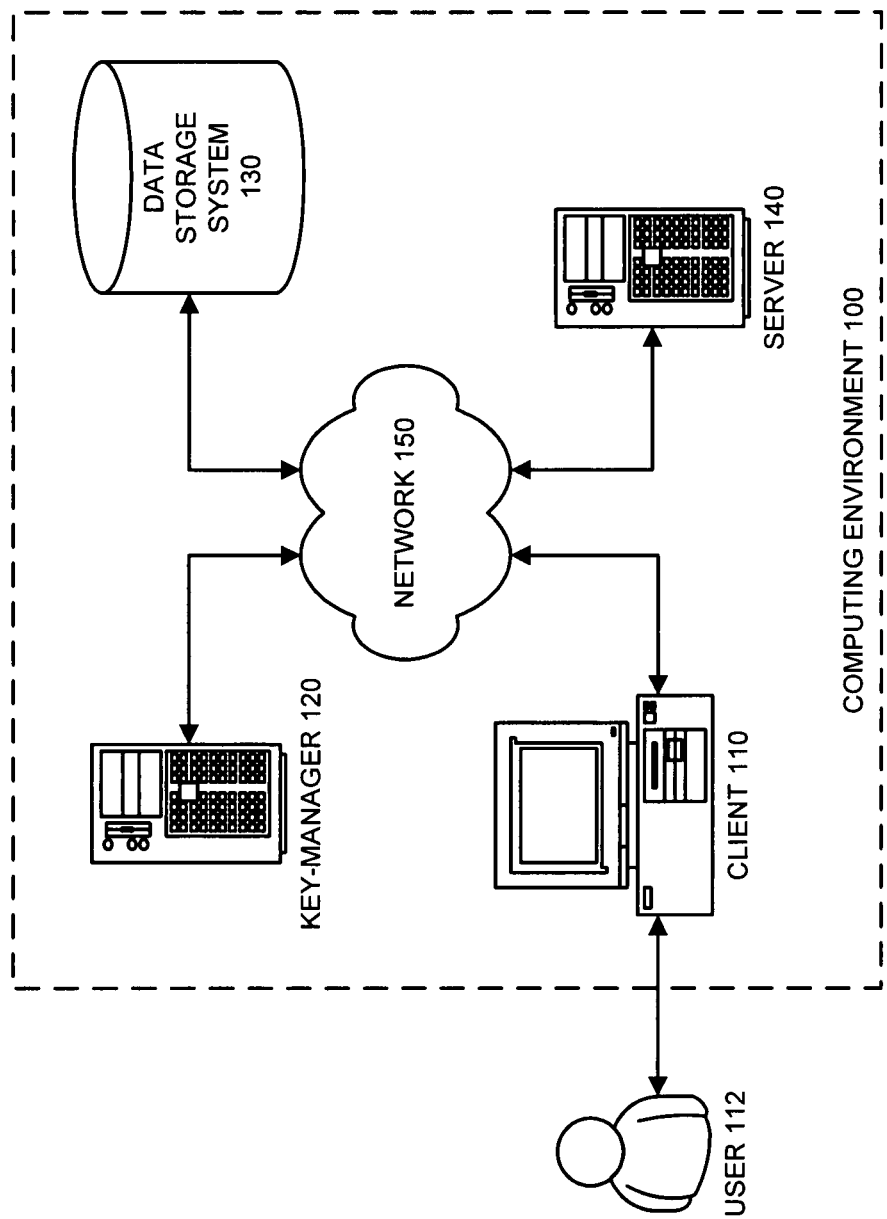
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention provides a storage management system that uses block-level encryption to perform subset of storage encryption. Note that subset of storage encryption involves encrypting each data block associated with a subset of storage. This has the advantage of ensuring that the storage management system encrypts all data including dependent data associated with a subset of storage. Then, each time a data storage system transaction or operation causes the storage management system to retrieve a data block from a storage medium, the storage management system decrypts the data block before storing the data block in a buffer cache associated with the storage management system. By encrypting the data block at retrieval, future operations involving the data block execute faster.

In one embodiment of the present invention, the storage management system can include a transaction system that can: undo a data storage system transaction; rollback the data storage system to a previous state; recover lost data; and perform any other operation associated with a transaction system.

In one embodiment of the present invention, an input/output layer, which facilitates communication between the storage management system and the storage medium, performs the encryption/decryption of the data blocks.

In one embodiment of the present invention, the storage management system only encrypts data blocks that a user identifies to be encrypted.

In one embodiment of the present invention, the user identifies data blocks to encrypt by associating the data blocks with a subset of storage that the user specifies to encrypt.

In one embodiment of the present invention, the storage management system encrypts any data block that the storage management system evicts from the buffer cache before sending the data block to the storage medium.

In one embodiment of the present invention, the storage management system automatically encrypts any dependent data which is associated with the data block. This can occur regardless of whether the data block is in the buffer cache or the storage medium. Moreover, this includes automatically encrypting and sending to the storage medium any logs associated with the data block. Furthermore, this may include encrypting temporary data. For example, if a query operation causes intermediate results or temporary data to be created and/or stored (temporarily or permanently), the storage management system automatically encrypts the intermediate results or temporary data.

In one embodiment of the present invention, performing an unexpected operation causes the storage management system to delete all data blocks from the buffer cache. Note that the combination of this embodiment and the previous embodiment prevents a malicious user from obtaining access to data blocks and dependent data associated with the data blocks by causing a system crash, or a denial of service.

In one embodiment of the present invention, a user can create partitioned objects, such as tables. In this embodiment, the user can assign a subset of partitions to an encrypted subset of storage, and a subset of partitions to an unencrypted subset of storage.

In one embodiment of the present invention, a user specifies a segment to encrypt. Note that a segment is a collection of data blocks that form a data storage system object. This data storage system object can include: a table; a stored procedure; a log; and any other data or data structure that a storage medium can store. This embodiment enables the storage management system to perform segment-level encryption, which enables finer granularity than subset of storage encryption.

In one embodiment of the present invention, each segment can be associated with its own segment-key.

In one embodiment of the present invention, each segment within a subset of storage shares the same storage-key. Note that a storage-key can be any type of cryptographic key which can encrypt/decrypt a subset of storage.

In one embodiment of the present invention, the storage-key can be: a directory-key; a tablespace-key; a file system key; a media-level key; or any other type of cryptographic key.

In one embodiment of the present invention, the data storage system can encrypt/decrypt any associated-data, or data associated with the data block. This associated-data can include: an undo log; a redo log; an archive log; a trace file dump; meta-data; a query; an intermediate table, which contains an intermediate result of an operation associated with the data block; and an operation result, which is a result of the operation associated with the data block; and any other data or auxiliary persistent data structure that can be associated with the data block. This embodiment prevents a malicious user from obtaining the data block (or data stored in the data block) by accessing the associated-data.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, computing environment 100 includes client 110, key-manager 120, data storage system 130, server 140, and network 150.

Client 110 can generally include any node on a network including computational capability and including a mechanism for communicating across the network.

Key-manager 120 can generally include any system for managing cryptographic keys. In one embodiment of the present invention, data storage system 130, or server 140 can include key-manager 120.

In one embodiment of the present invention, key-manager 120 can be an external security module.

In one embodiment of the present invention, key-manager 120 can communicate directly (i.e., not via network 150 or any other intermediary system) with data storage system 130 and/or server 140.

An external security module can generally include any physical or logical device created to be highly resistant to unauthorized access. A physical external security module (ESM) is referred to as a "hardware security module" (HSM). In an HSM, all sensitive data is stored in a separate physical storage device with its own access control policies. The physical storage device along with associated software interfaces are usually certified or tested against both physical and software-based intrusion attempts.

Data storage system 130 can generally include any type of data storage system, or system for storing data in non-volatile storage. This includes, but is not limited to, systems based upon magnetic, optical, and magneto-optical storage devices, as well as storage devices based on flash memory and/or battery-backed up memory.

In one embodiment of the present invention, data storage system 130 can be a database.

In one embodiment of the present invention, data storage system 130 can be a file system. In this embodiment, a subset of storage can be a directory or set of directories.

Server 140 can generally include any computational node including a mechanism for servicing requests from a client for computational and/or data storage resources.

Network 150 can generally include any type of wired or wireless communication channel capable of coupling together computing nodes. This includes, but is not limited to, a local area network, a wide area network, or a combination of networks. In one embodiment of the present invention, network 150 includes the Internet.

In one embodiment of the present invention, user 112 sends a data storage system operation to be executed to data storage system 130. Executing this operation causes data storage system 130 to retrieve a data block from a storage medium associated with data storage system 130. Before storing the data block in a buffer cache associated with data storage system 130, data storage system 130 decrypts the data block. By decrypting the data block before storing the data block in the buffer cache, data storage system 130 can execute subsequent data storage system operations associated with the data block faster than if the data block were stored in the buffer cache in an encrypted form.

In one embodiment of the present invention, in response to receiving a data storage system operation from user 112 that causes data storage system 130 to evict a data block from the buffer cache, data storage system 130 copies the data block from the buffer cache to the storage medium. However, before storing the data block in the storage medium, data storage system 130 encrypts the data block.

In one embodiment of the present invention, data storage system 130 automatically encrypts and stores dependent data associated with the data block in the storage medium. This occurs when a data storage system operation causes a change in the dependent data regardless of whether the data storage system operation causes data storage system 130 to evict the data block. This helps to ensure that data storage system 130 does not expose dependent data, such as redo logs, undo logs, archive logs, and trace file dumps, to malicious users by keeping all dependent data in encrypted form.

Data Storage System

Figure 2:
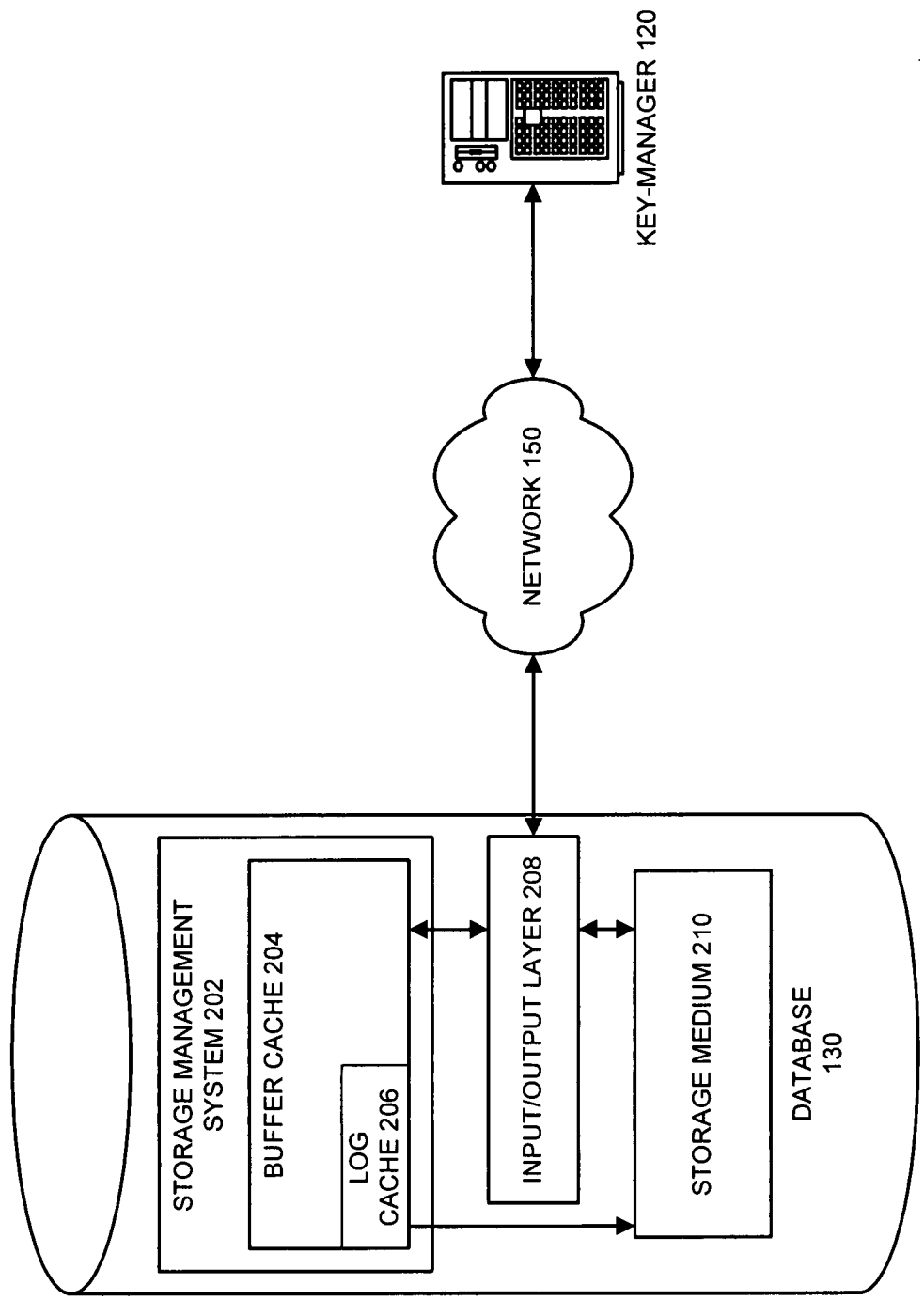
FIG. 2 illustrates a data storage system in accordance with an embodiment of the present invention.

FIG. 2 illustrates a data storage system 130 in accordance with an embodiment of the present invention. Data storage system 130 includes storage management system 202, input/output layer 208, and storage medium 210.

Storage management system 202 can generally include any system for accessing, manipulating, or storing data from data storage system 130. In one embodiment of the present invention, storage management system 202 includes buffer cache 204, which includes volatile memory that is used to temporarily store a copy of data that user 122, or an application, is currently accessing.

In one embodiment of the present invention, storage management system 202 can include a database management system.

In one embodiment of the present invention, the database management system can be a relational database management system.

In one embodiment of the present invention, buffer cache 204 includes log cache 206, which stores log-data that storage management system 202 is currently modifying or adding to a log. Note that log cache 206 communicates directly with storage medium 210. In this embodiment, storage management system 202 encrypts/decrypts the log and log-data.

In one embodiment of the present invention, log-data can include any dependent data associated with a data block.

In one embodiment of the present invention, log cache 206 is a separate component from buffer cache 204 and is not included as part of buffer cache 204.

In one embodiment of the present invention, log cache 206 communicates with storage medium 210 via input/output layer 208. In this embodiment, input/output layer 208 encrypts/decrypts the log and log-data.

Input/output layer 208 can generally include any system that can serve as an interface between buffer cache 204 and storage medium 210. In one embodiment of the present invention, input/output layer 208 serves as an interface between storage management system 202 and storage medium 210.

In one embodiment of the present invention, storage management system 202 can include input/output layer 208.

Storage medium 210 can generally include any non-volatile memory capable of storing data temporarily or long-term. For example, storage medium 210 can include a hard disk.

Retrieving a Data Block from a Storage Medium

Figure 3:
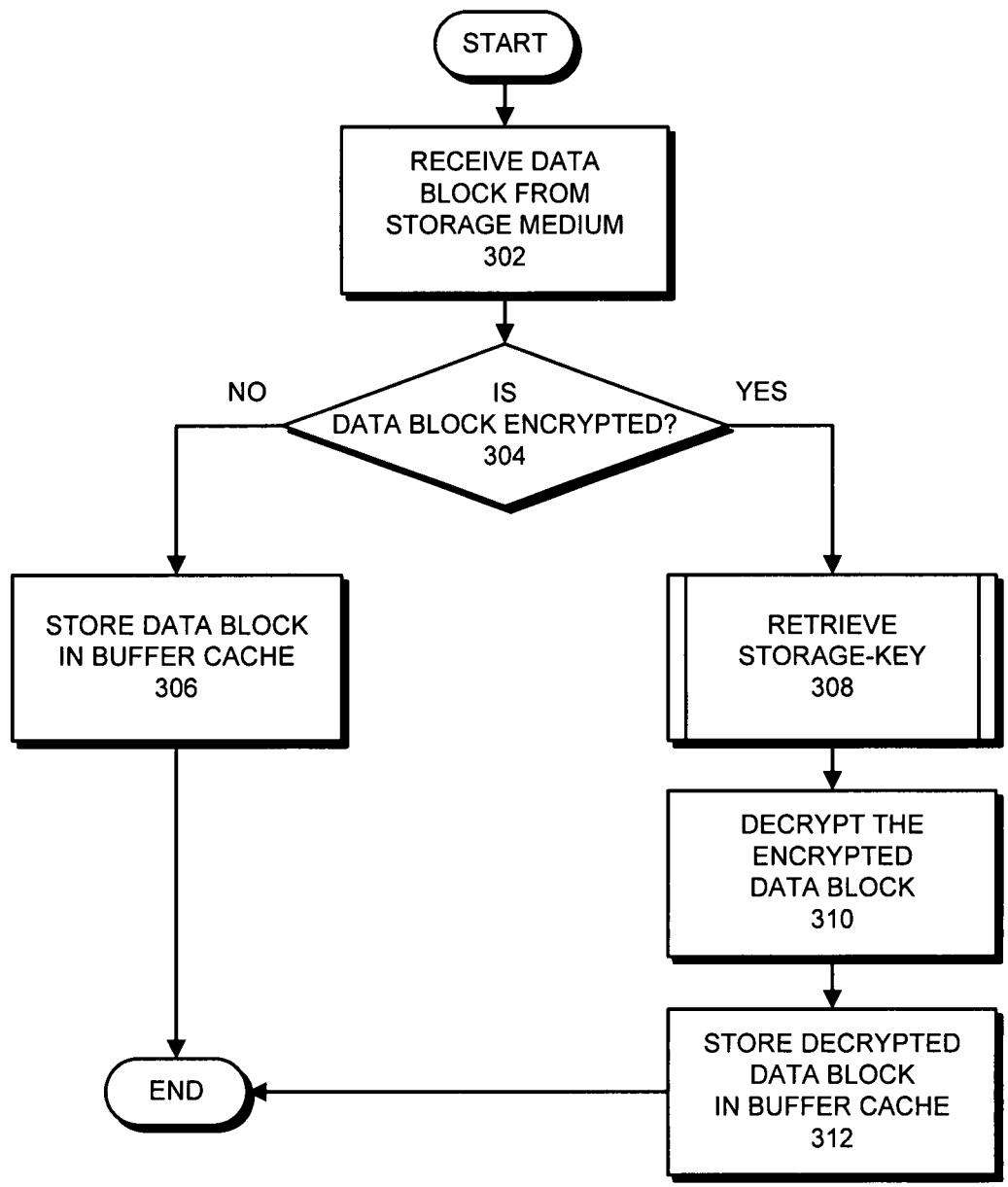
FIG. 3 presents a flowchart illustrating the process of retrieving a data block from a storage medium in accordance with an embodiment of the present invention.

FIG. 3 presents a flowchart illustrating the process of retrieving a data block from a storage medium 210 in accordance with an embodiment of the present invention. Note that a data block is a fixed-size block of data, which can be the smallest unit of storage in storage medium 210 that data storage system 130 can access or manipulate. Furthermore, note that the data block may or may not be equivalent in size to the bus that is used to communicate between storage medium 210, and input/output layer 208, buffer cache 204, or storage management system 202.

In one embodiment of the present invention, the process begins when input/output layer 208 receives a data block from storage medium 210 (step 302). Note that this may occur in response to data storage system 130 executing an operation received from user 112, or from an application that client 110 or server 140 hosts. Next, input/output layer 208 determines if the data block is encrypted (step 304). If not, input/output layer 208 stores the data block in buffer cache 204, which completes the process (step 306).

In one embodiment of the present invention, input/output layer 208 receives a segment from storage medium 210. Note that the segment is a collection of data blocks belonging to the same object. Furthermore, note that an object can include: a table; a stored procedure; a data structure; or any other logical collection of data.

If the data block is an encrypted data block, input/output layer 208 retrieves a storage-key from storage medium 210 (step 308). Note that the storage-key is associated with a subset of storage, which is associated with the encrypted data block. This storage-key is a cryptographic key, which can encrypt/decrypt any data block associated with the subset of storage. Furthermore, note that a "subset of storage" refers to a logical partition of storage medium 210. This logical partition can include: tables; stored procedures; indexes; and any other data storage system object that storage medium 210 can store. Moreover, step 308 is a multi-step process, which is described in more detail below with reference to FIG. 4.

In one embodiment of the present invention, the storage-key is associated with a physical, or logical storage volume.

In one embodiment of the present invention, the subset of storage can be a tablespace. Note that a "tablespace" refers to a logical partition of a storage medium associated with a database.

In one embodiment of the present invention, the storage-key can be a tablespace-key. Note that a tablespace-key is associated with a tablespace, which is associated with the encrypted data block.

In one embodiment of the present invention, the subset of storage can refer to the entire storage medium 210.

In one embodiment of the present invention, the storage-key is a segment-key, which can encrypt/decrypt data blocks associated with a segment.

After retrieving the storage-key, input/output layer 208 decrypts the encrypted data block to obtain a decrypted data block (step 310). Input/output layer 208 then stores the decrypted data block in buffer cache 204 (step 312).

Retrieving a Storage-Key

Figure 4:
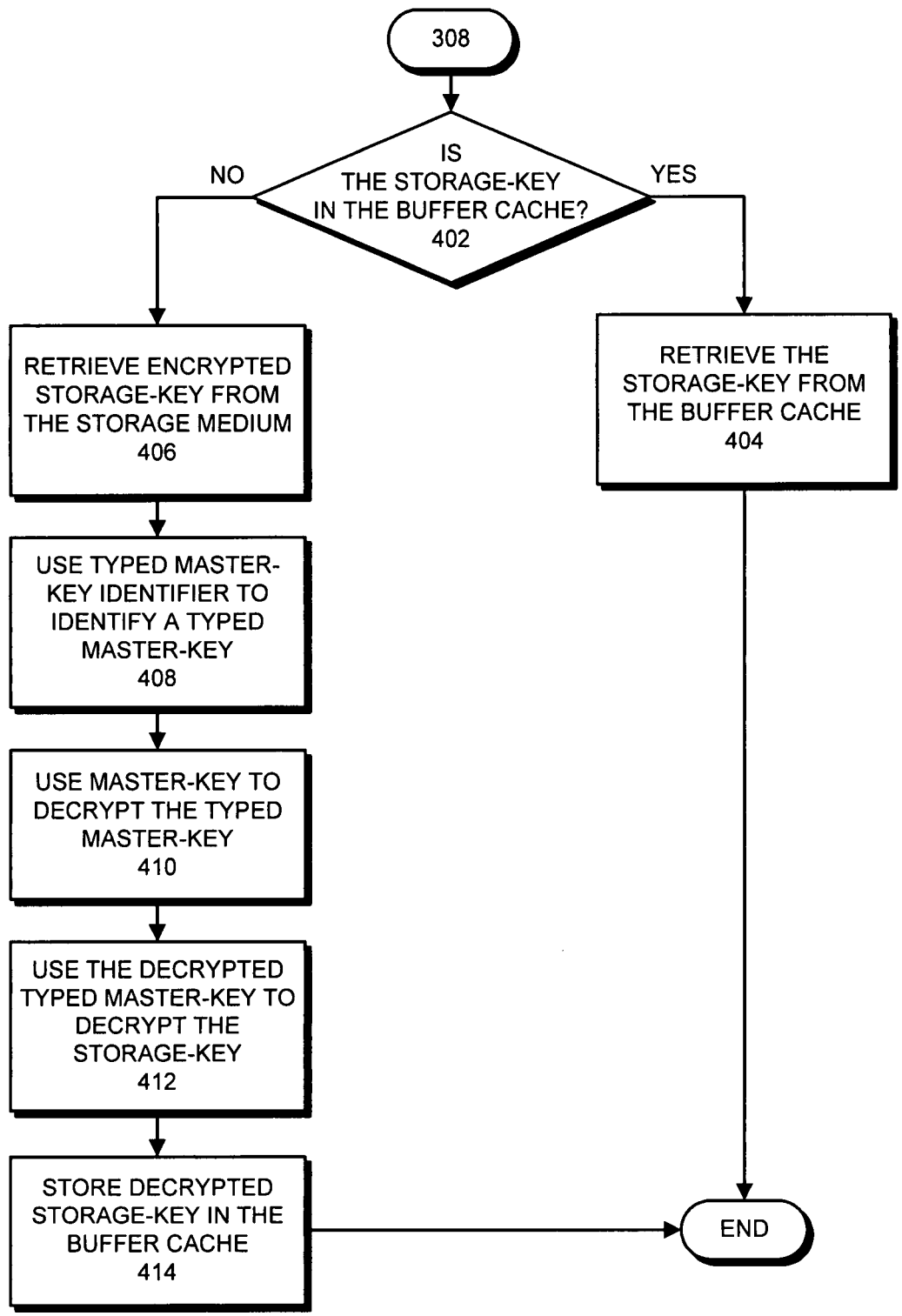
FIG. 4 presents a flowchart illustrating the process of retrieving a storage-key in accordance with an embodiment of the present invention.

FIG. 4 presents a flowchart illustrating the process of retrieving a storage-key in accordance with an embodiment of the present invention. The process begins when input/output layer 208 determines if the storage-key is in buffer cache 204 (step 402). If so, input/output layer 208 retrieves the storage-key from buffer cache 204, which completes the process (step 404).

In one embodiment, the storage-key that input/output layer 208 retrieves from buffer cache 204 is an encrypted storage-key. In this embodiment, input/output layer 208 proceeds to step 408.

If input/output layer 208 determines that the storage-key is not in buffer cache 204, input/output layer 208 retrieves an encrypted storage-key from storage medium 210 (step 406).

In one embodiment of the present invention, the storage-key is already decrypted. In this embodiment, input/output layer 208 proceeds to step 414.

Then, input/output layer 208 uses a typed master-key identifier associated with the storage-key to identify a typed master-key associated with the storage-key (step 408). Note that the typed master-key is a sub-master key that can serve as a master-key for a subset of cryptographic keys. Next, input/output layer 208 decrypts the typed master-key using a master-key to obtain a decrypted typed master-key (step 410). Input/output layer 208 then uses the decrypted master-key to decrypt the storage-key to obtain the decrypted storage-key (step 412). The process completes when input/output layer 208 stores the decrypted storage-key in buffer cache 204 (step 414).

In one embodiment of the present invention, key-manager 120 can be used to store the typed master-key and the master-key. In this embodiment, input/output layer 208 sends the encrypted storage-key and the typed master-key identifier associated with the encrypted storage-key to key-manager 120. Next, key-manager 120 performs steps 408, 410, and 412. Then, key-manager 120 sends the decrypted storage-key to input/output layer 208. Input/output layer 208 then performs step 414.

In one embodiment of the present invention, key-manager 120 sends the decrypted storage-key to storage management system 202. In this embodiment, storage management system 202 then performs step 414.

In one embodiment of the present invention, input/output layer 208 retrieves the storage-key from storage medium 210 upon verification or addition of a data block. In this embodiment, input/output layer 208 then stores the storage-key in memory and decrypts it when a data block requires encrypting or decrypting. Thus, if a data block requires encrypting or decrypting, the process begins with input/output layer 208 determining if the storage-key associated with the data block is encrypted. If not, input/output layer 208 retrieves the decrypted storage-key from buffer cache 204 (step 404). If so, input/output layer 208 retrieves the encrypted storage-key from buffer cache 204 and proceeds to step 408.

Writing a Data Block to a Storage Medium

Figure 5:
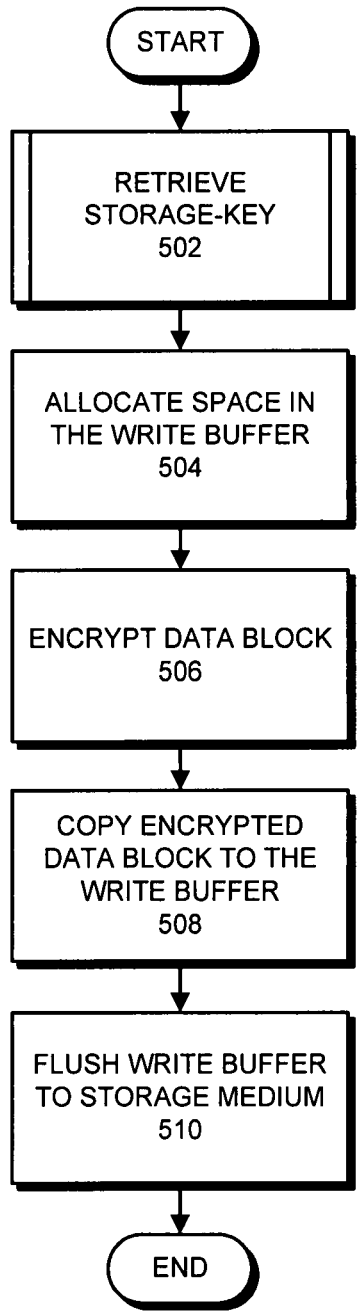
FIG. 5 presents a flowchart illustrating the process of writing a data block to a storage medium in accordance with an embodiment of the present invention.

FIG. 5 presents a flowchart illustrating the process of writing a data block to a storage medium 210 in accordance with an embodiment of the present invention. Note that this process is not continually occurring, but occurs in response to: buffer cache 204 being full and receiving a data block from storage medium 210; receiving an operation from user 112, or from an application that client 110 or server 140 hosts that requires storage management system 202 to remove a data block from buffer cache 204; or any other process that results in storage management system 202 evicting a data block from buffer cache 204.

In one embodiment of the present invention, storage management system 202 writes a data block to storage medium 210 each time an operation results in modification of a data block.

In one embodiment of the present invention, the process of writing a data block to storage medium 210 begins when input/output layer 208 retrieves a storage-key from buffer cache 204 (step 502). Note that this is a multi-step process similar to the process described above with reference to FIG. 4.

Input/output layer 208 then allocates space for the data block in the write buffer (not shown) (step 504). Note that buffer cache 204 can include the write buffer. In one embodiment of the present invention, storage management system 202 can include the write buffer in a separate memory module.

Next, input/output layer 208 uses the storage-key to encrypt the data block (step 506). Input/output layer 208 then copies the encrypted data block to the write buffer (step 508). Finally, input/output layer 208 flushes the write buffer to storage medium 210 (step 510).

Writing a Log to a Storage Medium

Figure 6:
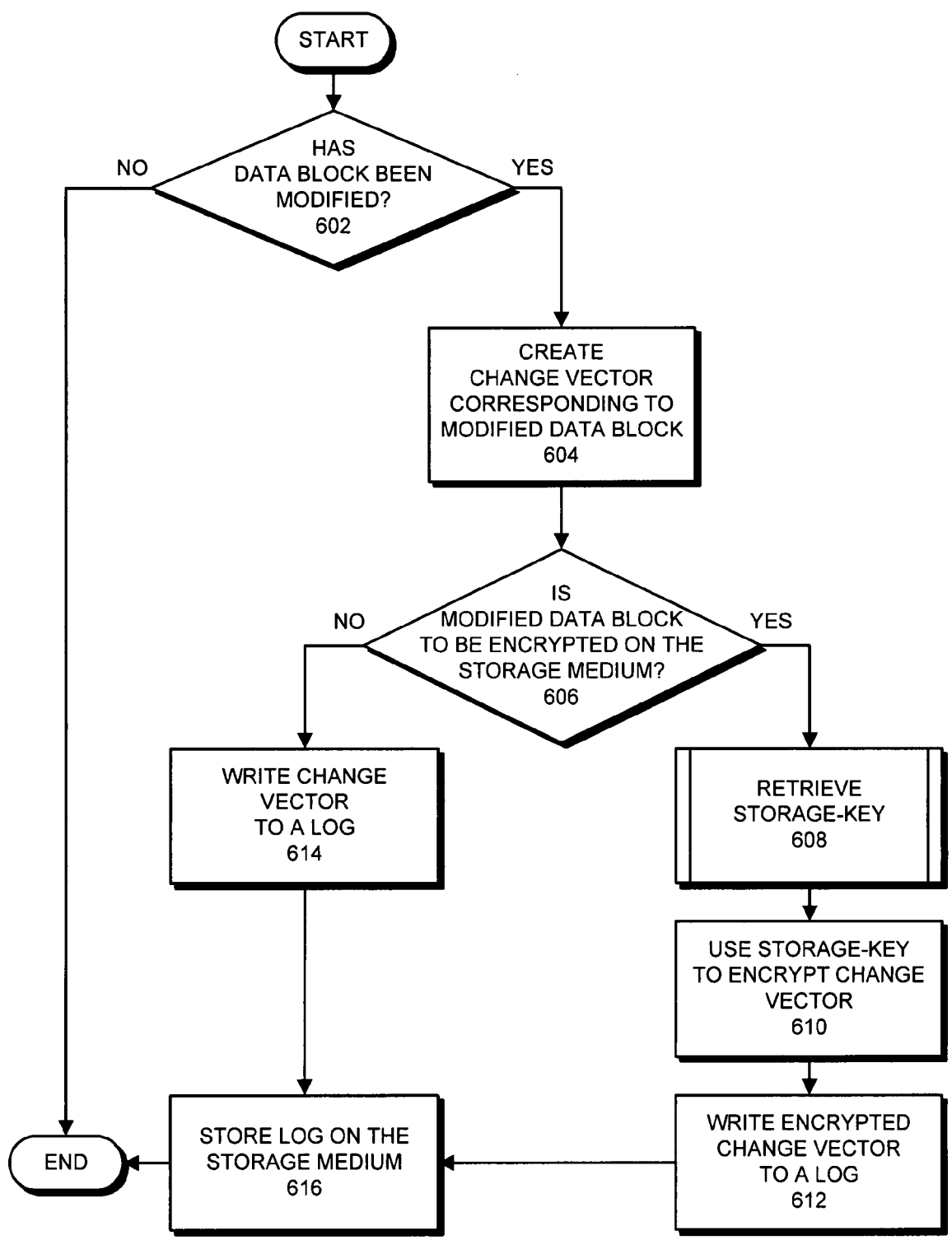
FIG. 6 presents a flowchart illustrating the process of writing a log to a storage medium in accordance with an embodiment of the present invention.

FIG. 6 presents a flowchart illustrating the process of writing a log to a storage medium 210 in accordance with an embodiment of the present invention. Note that the process of writing the log to storage medium 210 can occur continuously. For example, this process may occur each time data storage system 130 receives an operation-request from user 112, or from an application that client 110 or server 140 hosts.

In one embodiment of the present invention, the process of writing a log to storage medium 210 occurs in response to data storage system 130 receiving a log operation, or an operation that directly or indirectly initiates a log operation from user 112, or from an application that client 110 or server 140 hosts.

In one embodiment of the present invention, the process of writing a log to storage medium 210 begins when storage management system 202 determines if a data block has been modified (step 602). If so, storage management system 202 creates a change vector corresponding to the modified data block (step 604). Note that this change vector can include: a copy of the unmodified data block; a copy of the modified data block; a copy of the command that modified the data block; a copy of data storage system 130's state variables before the data block was modified; a copy of data storage system 130's state variables after the data block was modified; and any other information that a change vector or a log can specify. Next, storage management system 202 determines if storage medium 210 will store the modified data block in an encrypted form (step 606). Storage management system 202 can determine this by: checking if the unmodified data block was stored in an encrypted form; checking if a command received from user 112 specifies that the modified data block is to be encrypted; checking if storage medium 210 is configured to store the modified data block, or all data blocks in an encrypted form; or any other method for determining if storage medium 210 will store the modified data block in an encrypted form. If storage management system 202 determines that storage medium 210 will not store the modified data block in an encrypted form, storage management system 202 writes the change vector to a log in log cache 206 (step 614). Storage management system 202 then stores the log in storage medium 210 (step 616).

If storage management system 202 determines that storage medium 210 will store the modified data block in an encrypted form, storage management system 202 retrieves a storage-key (step 608). Note that this storage-key can be the storage-key associated with the modified data block, or a different storage-key. Furthermore, note that step 608 is a multi-step process similar to the process described above with reference to FIG. 4.

Storage management system 202 then uses the storage-key to encrypt the change vector (step 610). Next, storage management system 202 writes the encrypted change vector to a log (step 612). Finally, storage management system 202 stores the log in storage medium 210 (step 616).

In one embodiment of the present invention, storage management system 202 uses a log-specific key to encrypt the change vector. For example, if the log is a redo-log, storage management system 202 uses a redo-log key to encrypt the change vector. If instead the log is an undo-log, storage management system 202 uses an undo-log key to encrypt the change vector. Note that retrieval and use of the log-specific key is similar to that of the storage-key as described with reference to FIG. 4 and FIG. 6.

In one embodiment of the present invention, storage management system 202 uses a log-key to encrypt the change vector. This log-key is the same for each log type, but differs from the storage-key.

In one embodiment of the present invention, the log-key is randomly generated. In this embodiment, the log-key may or may not be the same for each type of log.

In one embodiment of the present invention, storage management system 202 encrypts the change vector regardless of whether storage medium 210 stores the modified data block in an encrypted format.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comprising:
   receiving a data block from a non-volative storage medium at an input/output interface between the non-volatile storage medium and a volatile buffer cache, wherein data blocks are fixed-size storage units in the non-volatile storage medium;
   responsive to the data block not being encrypted, storing the data block in the volatile buffer cache; and
   responsive to the data block being encrypted,
      using a storage-key to decrypt the encrypted data block, and
      storing the decrypted data block in the volatile buffer cache.

2. The method of claim 1, further comprising retrieving the storage-key, which involves:
   determining if the storage-key is in the volatile buffer cache;
   if so, retrieving the storage-key from the volatile buffer cache; and
   if not,
      retrieving the storage-key from the non-volatile storage medium,
      using a typed master-key identifier associated with the storage-key to identify a typed master-key associated with the storage-key,
      using a master-key to decrypt the typed master-key to produce a decrypted typed master-key,
      using the decrypted typed master-key to decrypt the storage-key to produce a decrypted storage-key, and
      storing the decrypted storage-key in the volatile buffer cache.

3. The method of claim 2, wherein the master-key and the typed-master-key are stored at a key-manager.

4. The method of claim 1, further comprising storing the decrypted data block to the non-volatile storage medium by:
   retrieving the storage-key;
   encrypting the decrypted data block using the storage-key; and
   storing the encrypted data block on the non-volatile storage medium.

5. The method of claim 1, further comprising writing a log to the non-volatile storage medium by:
   determining if the data block in the volatile buffer cache has been modified; and
   if so,
      creating a change vector corresponding to the modified data block,
      encrypting the change vector using the storage-key to produce an encrypted change vector,
      writing the encrypted change vector to the log, and
      storing the log on the non-volatile storage medium without waiting for a buffer cache flush instruction.

6. The method of claim 1, further comprising encrypting associated-data that is associated with the data block, wherein the associated-data can include:
   an undo log;
   a redo log;
   an archive log;
   a trace file dump;
   meta-data;
   a query;
   an intermediate table, which contains an intermediate result of an operation associated with the data block; and
   an operation result, which is a result of the operation associated with the data block.

7. The method of claim 1, wherein the storage-key is a segment-key, which is associated with a segment, wherein the segment can be any collection of data blocks that forms a data storage system object.

8. The method of claim 1, wherein in response to an unexpected operation, the method further comprises deleting contents of the volatile buffer cache without dumping the contents of the volatile buffer cache to the non-volatile storage medium.

9. The method of claim 1, wherein in the non-volatile storage medium is a file system.

10. The method of claim 1, wherein in the volatile buffer cache comprises memory.

11. The method of claim 1, wherein determining whether the data block is an encrypted data block involves determining whether the data block is associated with one or more of the following items which are to be stored in encrypted form:
   a table space;
   a table;
   an index;
   one or more stored procedures: and
   a data object.

12. A non-transitory computer-readable storage medium storing instructions that when executed by a computer cause the computer to perform a method, the method comprising:
   receiving a data block from a non-volatile storage medium at an input/output layer interface between the non-volatile storage medium and a volatile buffer cache, wherein data blocks are fixed-sized storage units in the non-volatile storage medium;
   responsive to the data block not being encrypted, storing the data block in the volatile buffer cache; and
   responsive to the data block being encrypted,
      using a storage-key to decrypt the encrypted data block, and
      storing the decrypted data block in the volatile buffer cache.

13. The computer-readable storage medium of claim 12, wherein the method further comprises retrieving the storage-key, which involves:
   determining if the storage-key is in the volatile buffer cache;
   if so, retrieving the storage-key from the buffer cache; and
   if not,
      retrieving the storage-key from the non-volatile storage medium,
      using a typed master-key identifier associated with the storage-key to identify a typed master-key associated with the storage-key,
      using a master-key to decrypt the typed master-key to produce a decrypted typed master-key,
      using the decrypted typed master-key to decrypt the storage-key to produce a decrypted storage-key, and
      storing the decrypted storage-key in the volatile buffer cache.

14. The computer-readable storage medium of claim 13, wherein the master-key and the typed-master-key are stored at a key-manager.

15. The computer-readable storage medium of claim 12, wherein the method further comprises storing the decrypted data block to the non-volatile storage medium by:
   retrieving the storage-key;
   encrypting the decrypted data block using the storage-key; and storing the encrypted data block on the non-volatile storage medium.

16. The computer-readable storage medium of claim 12, wherein the method further comprises writing a log to the non-volatile storage medium by:
   determining if the data block in the volatile buffer cache has been modified; and
   if so,
      creating a change vector corresponding to the modified data block,
      encrypting the change vector using the storage-key to produce an encrypted change vector,
      writing the encrypted change vector to the log, and
      storing the log on the non-volatile storage medium without waiting for a buffer cache flush instruction.

17. The computer-readable storage medium of claim 12, further comprising encrypting associated-data that is associated with the data block, wherein the associated-data can include:
   an undo log;
   a redo log;
   an archive log;
   a trace file dump;
   meta-data;
   a query;
   an intermediate table, which contains an intermediate result of an operation associated with the data block; and
   an operation result, which is a result of the operation associated with the data block.

18. The computer-readable storage medium of claim 12, wherein the storage-key is a segment-key, which is associated with a segment, wherein the segment can be any collection of data blocks that forms a data storage system object.

19. The computer-readable storage medium of claim 12, wherein in response to an unexpected operation, the method further comprises deleting contents of the volatile buffer cache without dumping the contents of the buffer cache to the non-volatile storage medium.

20. The computer-readable storage medium of claim 12, wherein in the non-volatile storage medium is a file system.

21. The computer-readable storage medium of claim 12, wherein the volatile buffer cache comprises memory.

22. The computer-readable storage medium of claim 12, wherein determining whether the data block is an encrypted data block involves determining whether the data block is associated with one or more of the following items which are to be stored in encrypted form:
   a table space;
   a table;
   an index;
   one or more stored procedures: and
   a data object.

23. An apparatus comprising:
   a processor;
   a receiver coupled to the processor and configured to receive a data block from a non-volatile storage medium at an input/output interface between the non-volatile data storage medium and a volatile buffer cache, wherein data blocks are fixed-size storage units in the non-volatile storage medium;
   a memory coupled to the processor and configured to store the data block in the volatile buffer cache responsive to the data block not being encrypted; and
   a decryption engine coupled to the processor and configured to decrypt the encrypted data block to produce a decrypted data block using a storage-key responsive to the data block being encrypted; and
   wherein the memory is further configured to store the decrypted data block in the volatile buffer cache.

24. The apparatus of claim 23 further comprises a retrieval engine configured to:
   determine if the storage-key is in the volatile buffer cache;
   retrieve the storage-key from the volatile buffer cache;
   retrieve the storage-key from the non-volatile storage medium;
   use a typed master-key identifier associated with the storage-key to identify a typed master-key associated with the storage-key;
   use a master-key to decrypt the typed master-key to produce a decrypted typed master-key;
   use the decrypted typed master-key to decrypt the storage-key to produce a decrypted storage-key; and to
   store the decrypted storage-key in the volatile buffer cache.

25. The apparatus of claim 23, wherein the memory is further configured to:
   retrieve the storage-key;
   encrypt the decrypted data block using the storage-key to produce the encrypted data block; and to
   store the encrypted data block on the non-volatile storage medium.

26. The apparatus of claim 23, further comprising a log-writing engine configured to write a log to the non-volatile storage medium by:
   determining if the data block in the volatile buffer cache has been modified; and
   if so,
      creating a change vector corresponding to the modified data block,
      encrypting the change vector using the storage-key to produce an encrypted change vector,
      writing the encrypted change vector to the log, and
      storing the log on the non-volatile storage medium without waiting for a buffer cache flush instruction.

27. The apparatus of claim 26, further comprising a deletion engine configured to delete, in response to an unexpected operation, contents to the volatile buffer cache without dumping the contents of the volatile buffer cache to the non-volatile storage medium.

28. The apparatus of claim 23 further comprises a determining engine configured to determine whether the data block is an encrypted data block by determining whether the data block is associated with one or more of the following items which are to be stored in encrypted form:
   a table space;
   a table;
   an index;
   one or more stored procedures: and
   a data object.

* * * * *

UNITED STATES PATENT AND TRADEMARK OFFICE
CERTIFICATE OF CORRECTION

PATENT NO. : 8,892,905 B2  
APPLICATION NO. : 11/726428  
DATED : November 18, 2014  
INVENTOR(S) : Lee et al.

Page 1 of 1

It is certified that error appears in the above-identified patent and that said Letters Patent is hereby corrected as shown below:

In the Claims

In column 9, line 60, in Claim 1, delete "non-volative" and insert -- non-volatile --, therefor.

In column 10, line 66, in Claim 9, delete "wherein in the" and insert -- wherein the --, therefor.

In column 11, line 1, in Claim 10, delete "wherein in the" and insert -- wherein the --, therefor.

In column 11, line 32, in Claim 13, before "buffer" insert -- volatile --.

In column 12, line 24, in Claim 20, delete "wherein in the" and insert -- wherein the --, therefor.

In column 12, line 37, in Claim 23, delete "apparatus" and insert -- apparatus, --, therefor.

In column 14, line 5, in Claim 27, delete "to the" and insert -- of the --, therefor.

Signed and Sealed this  
Sixteenth Day of June, 2015

Michelle K. Lee  
*Director of the United States Patent and Trademark Office*